(12) United States Patent
Lee et al.

(10) Patent No.: US 9,054,953 B2
(45) Date of Patent: Jun. 9, 2015

(54) HOME APPLIANCE AND HOME APPLIANCE SYSTEM

(75) Inventors: Phal Jin Lee, Changwon-si (KR); Hoi Jin Jeong, Changwon-si (KR); Jong Hye Han, Changwon-si (KR); Young Soo Kim, Changwon-si (KR); In Haeng Cho, Changwon-si (KR); Si Moon Jeon, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 378 days.

(21) Appl. No.: 12/432,184

(22) Filed: Apr. 29, 2009

(65) Prior Publication Data

US 2010/0023938 A1     Jan. 28, 2010

(30) Foreign Application Priority Data

Jun. 16, 2008   (KR) ..................... 10-2008-0056456

(51) Int. Cl.
| | |
|---|---|
| *G06F 15/177* | (2006.01) |
| *H04L 12/24* | (2006.01) |
| *H04L 12/28* | (2006.01) |
| *H04M 11/00* | (2006.01) |

(52) U.S. Cl.
CPC ............ *H04L 41/06* (2013.01); *H04L 12/2818* (2013.01); *H04M 11/007* (2013.01)

(58) Field of Classification Search
USPC ................................................ 709/220–222
See application file for complete search history.

(56) References Cited

U.S. PATENT DOCUMENTS

| | | | |
|---|---|---|---|
| 3,910,322 | A | 10/1975 | Hardesty et al. |
| 4,146,754 | A | 3/1979 | Rose |
| 4,766,505 | A | 8/1988 | Nakano et al. |
| 4,797,656 | A | 1/1989 | Keppler |
| 4,897,659 | A | 1/1990 | Mellon |
| 4,897,857 | A | 1/1990 | Wakatsuki et al. |
| 4,916,439 | A | 4/1990 | Estes et al. |
| 4,977,394 | A | 12/1990 | Manson et al. |
| 5,103,214 | A | 4/1992 | Curran et al. |
| 5,210,784 | A | 5/1993 | Wang et al. |
| 5,268,666 | A | 12/1993 | Michel et al. |
| 5,452,344 | A | 9/1995 | Larson |
| 5,506,892 | A | 4/1996 | Kojima et al. |
| 5,586,174 | A | 12/1996 | Bogner et al. |
| 5,664,218 | A | 9/1997 | Kim et al. |
| 5,757,643 | A | 5/1998 | Kuroda et al. |

(Continued)

FOREIGN PATENT DOCUMENTS

| | | |
|---|---|---|
| CN | 1212304 | 3/1999 |
| CN | 1343862 | 4/2002 |

(Continued)

OTHER PUBLICATIONS

International Search Report dated Dec. 1, 2010 (PCT/KR2010/002211).

(Continued)

*Primary Examiner* — Minh-Chau Nguyen
(74) *Attorney, Agent, or Firm* — Ked & Associates LLP

(57) ABSTRACT

A home appliance and a home appliance system are provided. The home appliance receives input of a sound including update information, and updates a product operating program. The home appliance system receives a sound including product information from the home appliance, judges whether to update the product operating program of the home appliance, and transmits update information.

5 Claims, 6 Drawing Sheets

(56) References Cited

U.S. PATENT DOCUMENTS

| | | | |
|---|---|---|---|
| 5,774,529 A | 6/1998 | Johannsen et al. | |
| 5,864,828 A | 1/1999 | Atkins | |
| 5,939,992 A | 8/1999 | Devries et al. | |
| 5,940,915 A | 8/1999 | Nam | 8/159 |
| 5,987,105 A * | 11/1999 | Jenkins et al. | 379/106.01 |
| 6,121,593 A | 9/2000 | Mansbery et al. | |
| 6,157,313 A | 12/2000 | Emmermann | |
| 6,424,252 B1 | 7/2002 | Adler | |
| 6,727,814 B2 | 4/2004 | Saltzstein et al. | |
| 6,759,954 B1 | 7/2004 | Myron et al. | |
| 6,763,458 B1 * | 7/2004 | Watanabe et al. | 713/100 |
| 6,778,868 B2 | 8/2004 | Imamura et al. | |
| 6,784,801 B2 | 8/2004 | Watanabe et al. | |
| 6,870,480 B2 | 3/2005 | Suzuki et al. | |
| 6,873,255 B2 | 3/2005 | Gallagher | |
| 6,906,617 B1 | 6/2005 | Van der Meulen | |
| 7,010,612 B1 | 3/2006 | Si et al. | |
| 7,135,982 B2 * | 11/2006 | Lee | 340/635 |
| 7,243,174 B2 | 7/2007 | Sheahan et al. | |
| 7,266,164 B2 | 9/2007 | Jeon et al. | |
| 7,280,643 B2 | 10/2007 | Howard et al. | 379/93.37 |
| 7,337,457 B2 | 2/2008 | Pack et al. | 725/40 |
| 7,363,031 B1 | 4/2008 | Aisa | |
| 7,383,644 B2 | 6/2008 | Lyu et al. | |
| 7,439,439 B2 | 10/2008 | Hayes et al. | 84/600 |
| 7,509,824 B2 | 3/2009 | Park et al. | 68/12.23 |
| 7,558,700 B2 | 7/2009 | Yamashita et al. | |
| 7,574,269 B2 | 8/2009 | Cenedese et al. | |
| 7,631,063 B1 | 12/2009 | Ho et al. | |
| 7,648,476 B2 | 1/2010 | Bock et al. | |
| 7,653,512 B2 | 1/2010 | Cheung et al. | 702/184 |
| 7,750,227 B2 | 7/2010 | Hayes et al. | |
| 7,843,819 B1 | 11/2010 | Benveniste | |
| 7,965,632 B2 | 6/2011 | Sugaya | |
| 8,027,752 B2 * | 9/2011 | Castaldo et al. | 700/296 |
| 8,040,234 B2 * | 10/2011 | Ebrom et al. | 709/220 |
| 8,045,636 B1 | 10/2011 | Lee et al. | |
| 8,132,049 B2 * | 3/2012 | Yasukawa et al. | 714/26 |
| 8,204,189 B2 | 6/2012 | Rhodes et al. | |
| 8,325,054 B2 | 12/2012 | Kim et al. | |
| 8,391,255 B2 | 3/2013 | Ribiere et al. | |
| 8,428,910 B2 | 4/2013 | Papadimitriou et al. | |
| 2002/0029575 A1 | 3/2002 | Okamoto | |
| 2002/0032491 A1 | 3/2002 | Imamura et al. | |
| 2002/0078742 A1 | 6/2002 | Kim | 73/162 |
| 2002/0097161 A1 | 7/2002 | Deeds | |
| 2002/0116959 A1 | 8/2002 | Ohta et al. | |
| 2002/0120728 A1 | 8/2002 | Braatz et al. | |
| 2003/0028345 A1 | 2/2003 | Watkins et al. | |
| 2003/0058101 A1 | 3/2003 | Watanabe et al. | |
| 2003/0110363 A1 | 6/2003 | Bachot et al. | |
| 2003/0128850 A1 | 7/2003 | Kimura et al. | |
| 2003/0144010 A1 * | 7/2003 | Dollinger | 455/456 |
| 2003/0167782 A1 | 9/2003 | Roh et al. | |
| 2003/0196492 A1 | 10/2003 | Remboski et al. | 73/593 |
| 2004/0032853 A1 | 2/2004 | D' Amico et al. | |
| 2004/0132444 A1 | 7/2004 | Herrmann | |
| 2004/0158333 A1 | 8/2004 | Ha et al. | |
| 2004/0211228 A1 | 10/2004 | Nishio et al. | |
| 2004/0249903 A1 | 12/2004 | Ha et al. | |
| 2004/0261468 A1 | 12/2004 | Lueckenbach | |
| 2005/0015890 A1 | 1/2005 | Kim et al. | |
| 2005/0028034 A1 | 2/2005 | Gantman et al. | |
| 2005/0029976 A1 | 2/2005 | Terry et al. | |
| 2005/0086979 A1 | 4/2005 | Son et al. | |
| 2005/0129200 A1 | 6/2005 | Forrest et al. | 379/93.37 |
| 2005/0134472 A1 | 6/2005 | Jang et al. | |
| 2005/0162909 A1 | 7/2005 | Wooldridge | |
| 2005/0222859 A1 | 10/2005 | Ha | |
| 2006/0048405 A1 | 3/2006 | Baek et al. | |
| 2006/0066758 A1 | 3/2006 | Higashihara | |
| 2006/0089818 A1 | 4/2006 | Norell et al. | |
| 2006/0136544 A1 | 6/2006 | Atsmon et al. | |
| 2006/0168740 A1 | 8/2006 | Ha et al. | |
| 2006/0259199 A1 * | 11/2006 | Gjerde et al. | 700/284 |
| 2007/0113595 A1 | 5/2007 | Harwood et al. | |
| 2007/0137265 A1 | 6/2007 | Shikamori et al. | |
| 2007/0175883 A1 | 8/2007 | Miu et al. | |
| 2007/0189323 A1 | 8/2007 | Swoboda et al. | |
| 2007/0219756 A1 | 9/2007 | Frankel et al. | |
| 2007/0272286 A1 | 11/2007 | Curtius et al. | |
| 2008/0036619 A1 | 2/2008 | Rhodes et al. | |
| 2008/0072383 A1 | 3/2008 | Bextermoller et al. | |
| 2008/0122648 A1 | 5/2008 | Ebrom et al. | |
| 2008/0181058 A1 * | 7/2008 | Hayakawa | 367/125 |
| 2009/0036778 A1 * | 2/2009 | Cohen et al. | 600/459 |
| 2009/0067102 A1 | 3/2009 | Cline et al. | |
| 2009/0160637 A1 | 6/2009 | Maeng | |
| 2009/0169434 A1 | 7/2009 | Ogusu | |
| 2009/0282308 A1 | 11/2009 | Gutsche et al. | |
| 2009/0323914 A1 | 12/2009 | Lee et al. | |
| 2010/0023938 A1 | 1/2010 | Lee et al. | |
| 2010/0027770 A1 | 2/2010 | Park et al. | |
| 2010/0037401 A1 | 2/2010 | Bae et al. | |
| 2010/0116060 A1 | 5/2010 | Murayama | 73/593 |
| 2010/0318324 A1 | 12/2010 | Kim et al. | |
| 2011/0022358 A1 | 1/2011 | Han et al. | |
| 2011/0054845 A1 | 3/2011 | Han et al. | |
| 2011/0060553 A1 | 3/2011 | Han et al. | |
| 2011/0074589 A1 | 3/2011 | Han et al. | |
| 2011/0200189 A1 | 8/2011 | True et al. | |

FOREIGN PATENT DOCUMENTS

| | | |
|---|---|---|
| CN | 1393672 | 1/2003 |
| CN | 1409886 | 4/2003 |
| CN | 1424843 | 6/2003 |
| CN | 1497915 | 5/2004 |
| CN | 1606282 | 4/2005 |
| CN | 1690685 | 11/2005 |
| CN | 2797999 | 7/2006 |
| CN | 101202639 | 6/2008 |
| CN | 101447119 | 6/2009 |
| CN | 101680693 | 3/2010 |
| CN | 102017520 | 4/2011 |
| EP | 0 038 687 | 10/1981 |
| EP | 0 510 519 | 10/1992 |
| EP | 0 617 557 A2 | 9/1994 |
| EP | 0 846 991 | 6/1998 |
| EP | 0 851 054 | 7/1998 |
| EP | 0 887 989 | 12/1998 |
| EP | 1 186 694 | 3/2002 |
| EP | 1 186 695 | 3/2002 |
| EP | 0 691 060 | 5/2004 |
| EP | 2 180 648 | 4/2010 |
| JP | 04-241563 | 8/1992 |
| JP | 04-358497 | 12/1992 |
| JP | 07-239176 | 9/1995 |
| JP | 10-133767 | 5/1998 |
| JP | 11-127254 | 5/1999 |
| JP | 11-127254 | 11/1999 |
| JP | 2001-345949 | 12/2001 |
| JP | 2001-353395 A | 12/2001 |
| JP | 2002-000988 A | 1/2002 |
| JP | 2002-011274 A | 1/2002 |
| JP | 2002-031471 | 1/2002 |
| JP | 2002-045590 A | 2/2002 |
| JP | 2002-85887 | 3/2002 |
| JP | 2002-162149 | 6/2002 |
| JP | 2002-279091 | 9/2002 |
| JP | 2003-172578 | 6/2003 |
| JP | 2004-085071 | 3/2004 |
| JP | 2004-215125 | 7/2004 |
| JP | 2005-061757 | 3/2005 |
| JP | 2005-273943 | 10/2005 |
| JP | 2007-267956 | 10/2007 |
| JP | 2008-003562 | 1/2008 |
| KR | 10-1991-0020404 A | 12/1991 |
| KR | 10-1996-0003308 A | 1/1996 |
| KR | 10-1997-0019443 A | 4/1997 |
| KR | 10-0127232 | 10/1997 |
| KR | 10-0127232 B1 | 10/1997 |
| KR | 10-0143209 | 8/1998 |
| KR | 10-1999-020285 | 3/1999 |

(56) References Cited

FOREIGN PATENT DOCUMENTS

| KR | 20-1999-0040564 U | 12/1999 |
|---|---|---|
| KR | 20-0162050 | 12/1999 |
| KR | 20-0330611 Y1 | 12/1999 |
| KR | 10-2000-0018678 A | 4/2000 |
| KR | 10-2001-0063913 A | 5/2001 |
| KR | 10-2001-0055394 A | 7/2001 |
| KR | 10-2002-0020831 A | 3/2002 |
| KR | 10-2002-0030426 A | 4/2002 |
| KR | 10-2002-0039959 | 5/2002 |
| KR | 10-2003-0000189 | 1/2003 |
| KR | 10-0389690 B1 | 6/2003 |
| KR | 10-0406094 B1 | 11/2003 |
| KR | 10-2004-0050767 | 6/2004 |
| KR | 10-2004-0095017 | 11/2004 |
| KR | 10-2004-0103352 | 12/2004 |
| KR | 10-2005-0062747 A | 6/2005 |
| KR | 10-2005-0097282 A | 10/2005 |
| KR | 10-2006-0056973 | 5/2006 |
| KR | 10-2006-0103014 | 9/2006 |
| KR | 10-0641974 | 11/2006 |
| KR | 10-2007-0013090 | 1/2007 |
| KR | 10-2008-0068447 | 7/2008 |
| KR | 10-0887575 | 3/2009 |
| KR | 10-2009-0115066 | 11/2009 |
| KR | 10-2010-0112950 | 10/2010 |
| KR | 10-2011-0010375 | 2/2011 |
| KR | 10-2011-0010378 | 2/2011 |
| WO | WO 01/11575 | 2/2001 |
| WO | WO 2005/106096 | 11/2005 |
| WO | WO 2008/010670 | 1/2008 |
| WO | WO 2008/117981 | 10/2008 |
| WO | WO 2009/134090 | 11/2009 |

OTHER PUBLICATIONS

International Search Report dated Dec. 1, 2010 (PCT/KR2010/002222).
International Search Report dated Aug. 23, 2010 issued in Application No. PCT/KR2010/000319.
PCT International Search Report dated May 26, 2011 issued in Application No. PCT/KR2010/005108.
Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086.
European Search Report dated Oct. 14, 2011 issued in Application No. 09 73 8950.
U.S. Office Action issued in U.S. Appl. No. 12/432,111 dated May 2, 2012.
European Search Report dated May 8, 2012.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
U.S. Office Action issued in U.S. Appl. No. 12/757,246 dated May 18, 2012.
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
U.S. Office Action issued in U.S. Appl. No. 12/603,810 dated Jul. 5, 2012.
U.S. Office Action issued in U.S. Appl. No. 12/431,910 dated Jul. 23, 2012.
International Search Report dated Apr. 25, 2011 issued in Application No. PCT/KR 2010/004407.
United States Office Action dated Feb. 10, 2012 issued in U.S. Appl. No. 12/568,022.
United States Office Action dated Feb. 14, 2012 issued in U.S. Appl. No. 12/431,910.
United States Office Action dated Mar. 1, 2012 issued in U.S. Appl. No. 12/846,040.
Russian Office Action dated Feb. 7, 2012. (with translation).
U.S. Office Action issued in U.S. Appl. No. 12/431,903 dated Mar. 8, 2012.
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in U.S. Appl. No. 12/757,205 dated Apr. 2, 2012.
Korean Office Action dated Feb. 26, 2014.
Korean Office Action dated Feb. 28, 2014.
Chinese Office Action dated Mar. 4, 2014.
Chinese Office Action dated Mar. 5, 2014.
Japanese Office Action dated Oct. 29, 2013, 2012-548898.
U.S. Office Action issued in U.S. Appl. No. 12/847,272 dated Dec. 2, 2013.
U.S. Office Action issued in U.S. Appl. No. 12/847,284 dated Dec. 4, 2013.
U.S. Office Action issued in U.S. Appl. No. 12/847,406 dated Dec. 17, 2013.
U.S. Office Action issued in U.S. Appl. No. 12/847,306 dated Dec. 17, 2013.
U.S. Office Action issued in U.S. Appl. No. 12/432,111 dated Nov. 15, 2012.
Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
U.S. Office Action issued in U.S. Appl. No. 12/432,132 dated Dec. 19, 2012.
U.S. Office Action issued in U.S. Appl. No. 12/850,240 dated Dec. 27, 2012.
U.S. Office Action issued in U.S. Appl. No. 12/846,013 dated Dec. 28, 2012.
U.S. Notice of Allowance issued in U.S. Appl. No. 12/847,303 dated Jan. 11, 2013.
U.S. Office Action issued in U.S. Appl. No. 12/431,903 dated Jan. 2, 2013.
U.S. Office Action issued in U.S. Appl. No. 12/757,246 dated Jan. 17, 2013.
U.S. Office Action issued in U.S. Appl. No. 12/431,893 dated Jan. 29, 2013.
Chinese Office Action dated Dec. 16, 2013.(translation), 2010/80033136.2.
European Office Action dated Jan. 7, 2014.
Australian Office Action dated Jan. 13, 2014, 2010/269313.
Korean Office Action dated Jan. 28, 2014. Sep. 5, 2014, 9-5-2014-009709889.
Japanese Office Action dated Feb. 4, 2014, 2012-519470.
European Search Report dated Dec. 17, 2012.
European Search Report dated Jan. 2, 2013.
Ethem M Sözer; "Simulation and Rapid Prototyping Environment for Underwater Acoustic Communications: Reconfigurable Modem"; Oceans—Europe 2005; MIT Sea Grant College Program; Cambridge, MA, 02139; IEEE; pp. 80-85 (XP10838461A).
U.S. Office Action issued in U.S. Appl. No. 12/757,339 dated Jan. 31, 2013.
European Search Report dated Jan. 31, 2013 (10761908.2).
European Search Report dated Jan. 31, 2013 (10797292.9).
Japanese Office Action dated Feb. 12, 2013. (with translation).
U.S. Office Action issued in U.S. Appl. No. 12/603,810 dated Feb. 13, 2013.
U.S. Office Action issued in U.S. Appl. No. 12/551,827 dated Mar. 11, 2013.
U.S. Office Action issued in U.S. Appl. No. 12/842,649 dated Mar. 22, 2013.
International Search Report issued in Application No. PCT/KR2011/000311 dated Jul. 28, 2011.
U.S. Office Action issued in U.S. Appl. No. 12/431,893 dated Jul. 31, 2012.

(56) References Cited

OTHER PUBLICATIONS

Notice of Allowance issued in Application No. 12/842,679 dated Aug. 1, 2012.
U.S. Office Action issued in U.S. Appl. No. 12/431,903 dated Aug. 2, 2012.
Russian Office Action issued in Application No. 2010144513/08 dated Jun. 27, 2012.
Korean Office Action dated Aug. 13, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
Japanese Office Action dated Sep. 11, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
Korean Notice of Allowance dated Aug. 30, 2013, 9-5-2013-060815358.
U.S. Office Action issued in U.S. Appl. No. 12/842,649 dated Oct. 8, 2013.
Chinese Office Action dated Oct. 10, 2013 (416610).
U.S. Notice of Allowance issued in U.S. Appl. No. 12/846,013 dated Nov. 5, 2013.
U.S. Office Action issued in U.S. Appl. No. 12/757,232 dated Apr. 18, 2013.
U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued in U.S. Appl. No. 12/432,111 dated Jun. 13, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
U.S. Office Action issued in U.S. Appl. No. 12/847,406 dated Jul. 9, 2013.
U.S. Office Action issued in U.S. Appl. No. 12/847,306 dated Jul. 9, 2013.
Chinese Office Action dated Jun. 27, 2013.
U.S. Office Action issued in U.S. Appl. No. 12/431,893 dated Jul. 30, 2013.
U.S. Office Action issued in U.S. Appl. No. 12/757,339 dated Sep. 6, 2013.
Australian Office Action dated Sep. 22, 2014.
Chinese Office Action dated Oct. 8, 2014.
U.S. Notice of Allowance issued in U.S. Appl. No. 13/382,334 dated Nov. 12, 2014.
U.S. Office Action issued in U.S. Appl. No. 13/562,704 dated Nov. 19, 2014.
U.S. Notice of Allowance issued in U.S. Appl. No. 12/842,649 dated Dec. 10, 2014.
U.S. Office Action issued in U.S. Appl. No. 12/842,649 dated Aug. 15, 2014.
Korean Office Action dated May 26, 2014.
U.S. Notice of Allowance issued in U.S. Appl. No. 12/757,339 dated May 28, 2014.
U.S. Office Action issued in U.S. Appl. No. 13/382,334 dated Jun. 5, 2014.
Chinese Office Action dated Oct. 30, 2014.
Japanese Office Action dated Nov. 18, 2014.
Chinese Office Action dated Dec. 3, 2014.
U.S. Notice of Allowance issued in U.S. Appl. No. 13/922,669 dated. Dec. 31, 2014.
U.S. Office Action issued in U.S. Appl. No. 13/588,164 dated Apr. 3, 2015.
U.S. Office Action issued in U.S. Appl. No. 13/562,704 dated Apr. 9, 2015.

* cited by examiner

HOME APPLIANCE AND HOME APPLIANCE SYSTEM

BACKGROUND

1. Field

The present invention relates to a home appliance and a home appliance system including the home appliance, and more particularly, to a home appliance which outputs a sound including product information to the outside and receives input of a sound including update information for a product operating program from the outside to update the product operating program, and a home appliance system including the same.

2. Background

Home appliances and home appliance systems are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

Figure 1:
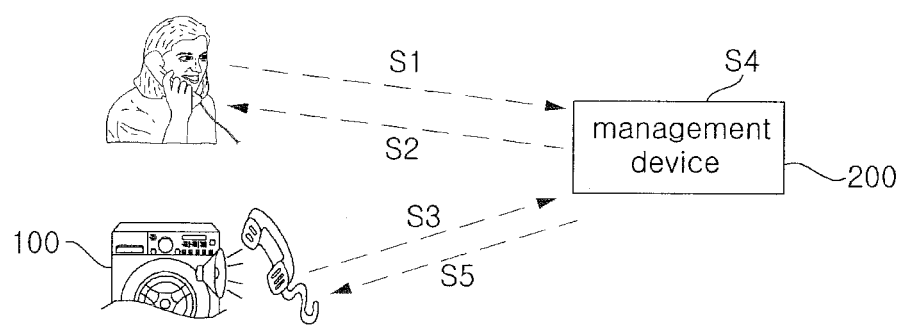
FIG. 1 is a configuration view illustrating a configuration of a home appliance 100 and a home appliance system 300 according to an embodiment. of the present invention.

Conventionally, in order to update a product operating program included in a home appliance, a user calls a service center and a customer engineer visits the user and updates the product operating program. Otherwise, the user visits the service center and gets the product operating program, or downloads the product operating program through an internet and updates the program in person.

Particularly, when a problem occurring during the operation of the product is caused by a fault of the product operating program, the user cannot accurately understand the problem and update the product operating program to solve the problem.

European Patent No. 0510519 discloses a technique of sending fault information of a home appliance to a service center by using a telephone network via a modem connected to the home appliance. With this technique, the modem must be connected to the home appliance. However, a home appliance, such as a laundry treatment machine, may be installed outdoors, and thus, there are location restrictions that must be considered when connecting the laundry treatment machine and the telephone network.

U.S. Pat. No. 5,987,105 discloses a technique of converting fault information of a home appliance into a sound of an audible frequency band using a telephone network and transmitting the same to a service center via a telephone. However, it is not easy to upgrade a product operating program of the home appliance.

The advantages and features of the present invention and methods for accomplishing the same will become apparent from the following description of embodiments given in conjunction with the accompanying drawings. However, the present invention is not limited to the embodiments disclosed below but may be implemented into different forms. These embodiments are provided only for illustrative purposes and for full understanding of the scope of the present invention by those skilled in the art. The scope of the present invention is defined by the appended claims. Like reference numerals indicate like elements in the whole description.

Hereinafter, a home appliance 100 and a home appliance system 300 according to embodiments of the present invention will be described with reference to the accompanying drawings.

FIG. 1 is a configuration view illustrating a configuration of the home appliance 100 and the home appliance system 300 according to an embodiment. of the present invention. Referring to FIG. 1, when a problem occurs in an operation of the home appliance 100, a user asks for repairs to a management device 200 via communication means such as a telephone network (S1).

The management device 200 asks the user to send a sound including product information (S2). Here, the product information includes fault information and product operating program information of the home appliance 100.

The user outputs the sound including the product information through manipulation means provided in the home appliance 100 (S3) upon the request of the management device 200 (S2).

The management device 200 receives the sound via the communication network, analyzes the product information included in the sound, and judges whether it is necessary to update a product operating program of the home appliance 100 (S4).

When the management device 200 judges that it is necessary to update the product operating program of the home appliance 100, it sends an acoustic signal including update information to the user via the communication network (S5). The acoustic signal is output as a sound including update information through an external terminal 10 such as a telephone. The home appliance 100 analyzes the sound including the update information, and updates the product operating program of the home appliance 100.

Hereinafter, the home appliance 100 of the present invention will be described using a laundry treatment machine, but is not limited thereto. It is apparent that the present invention is applicable to the whole home appliances 100 such as a TV, an air conditioner, a refrigerator, an electric rice cooker and a microwave oven.

Figure 2:
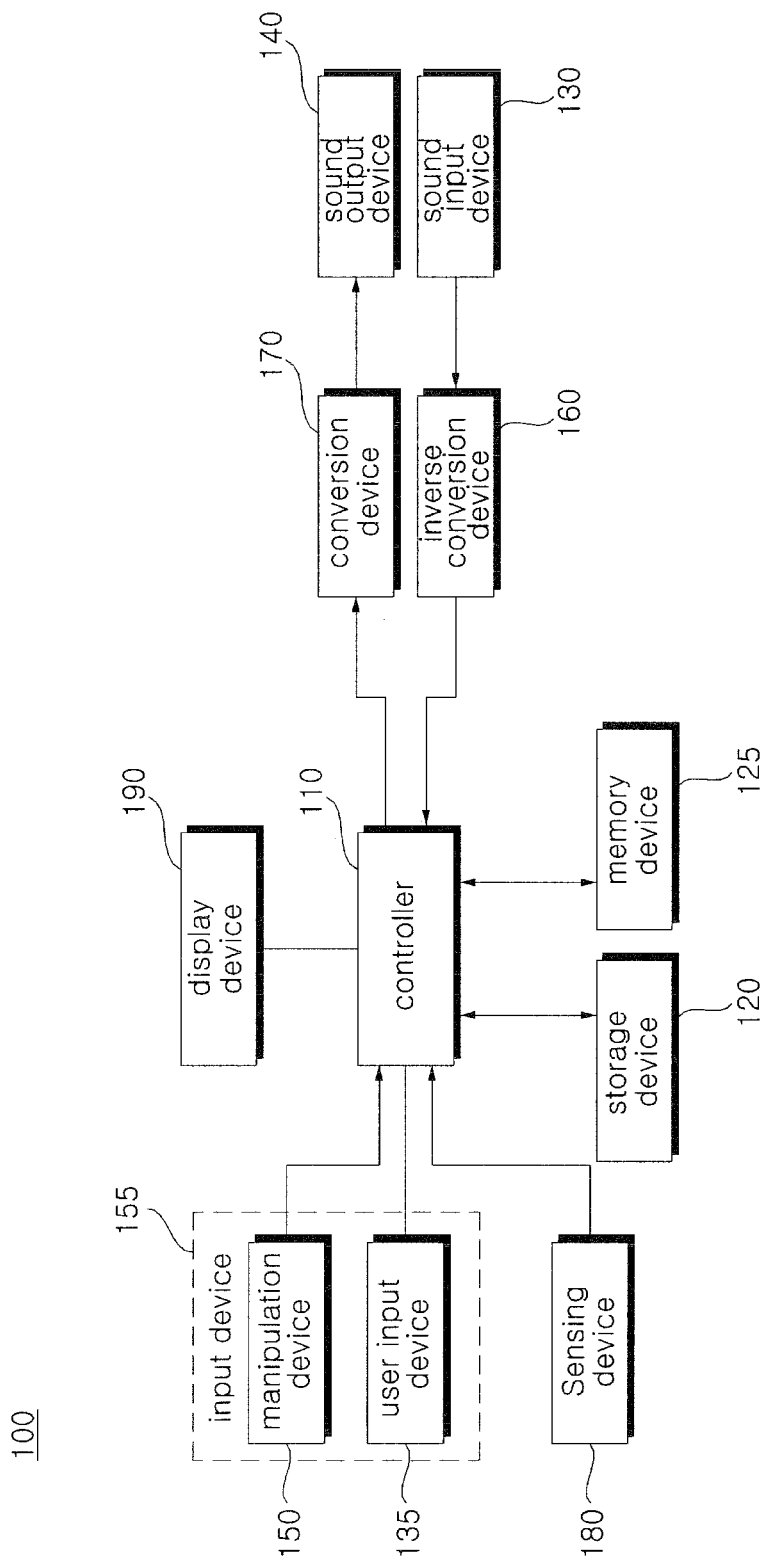
FIG. 2 is a block diagram illustrating a construction of a laundry treatment machine 100 according to an embodiment of the present invention.

FIG. 2 is a block diagram illustrating a construction of a laundry treatment machine 100 according to an embodiment. of the present invention. Referring to FIG. 2, the laundry treatment machine 100 includes a sound input device 130 that receives input of a sound being transferred via air vibration and including update information, an inverse conversion device 160 that inversely converts the sound input through the sound input device 130 to generate the update information, an input device 155 that receives input of an external signal for executing fault diagnosis from a user, a storage device 120 that stores product information of the laundry treatment machine 100 for the fault diagnosis and a product operating program of the laundry treatment machine 100, a controller 110 that updates the product operating program using the update information generated by the inverse conversion device 160, and loads the product information stored in the storage device 120 and outputs a control signal when the fault diagnosis is selected through the input device 155, a sound output device 140 that outputs a sound corresponding to the control signal of the controller 110, and a conversion device 170 that is provided between the controller 110 and the sound output device 140 to generate an acoustic signal to drive the sound output device 140 according to the control signal.

The storage device 120 is means that stores the product operating program and the like for controlling an operating state of the laundry treatment machine 100, and may be implemented with a variety of storage media such as a semiconductor memory, a magnetic recording device like a hard disk, and so on.

The storage device 120 can be included in the controller 110. EEPROM (Electrically Erasable Programmable Read-Only Memory) can be the storage device 120.

The sound input device 130 is means that receives input of the sound being transferred from the outside via air vibration, and including the update information for the product operating program of the home appliance 100 (hereinafter, 'the update information for the product operating program of the laundry treatment machine 100' will be referred to as 'the update information'), and may be formed of a kind of microphone. The sound input device 130 receives input of the sound including the update information, and converts the sound into an acoustic signal. The acoustic signal is an electrical signal with a frequency characteristic, and includes same information as the update information.

The inverse conversion device 160 inversely converts the acoustic signal into the update information. That is, the inverse conversion device 160 inversely converts the acoustic signal which is an electrical signal into the update information which is a digital signal, and the controller 110 updates the product operating program stored in the storage device 120 using the update information.

A sensing device 180 is a kind of sensor that senses the operating state of the laundry treatment machine 100. For example, when a problem occurs in an operation of a drainage pump (not shown) during a drainage process of the laundry treatment machine 100 such that the drainage is not ended within a preset drainage setting time, the controller 110 compares a drainage time sensed by the sensing device 180 with the drainage setting time, and judges whether the laundry treatment machine 100 is out of order.

The input device 155 may include a user input device 135 that receives input of an operation control command. When the user inputs the operation control or signal conversion command through the user input device 135, the controller 110 may control the conversion device 170 to convert the product information into the at least one acoustic signal. The sound output device 140 may output the at least one acoustic signal generated by the conversion device 170 as a sound.

In more detail, the controller 110 outputs the control signal including the product information to control the conversion device 170 to convert the product information into the acoustic signal which is the electrical signal with the frequency characteristic. And, the conversion device 170 may be a kind of DA converter that converts the digital data including the product information into the acoustic signal which is the electrical signal with the frequency characteristic according to the control signal. Here, the acoustic signal is a combination of unit frequency signals continuing for a predetermined time, and each unit frequency signal is any one of two different frequency signals.

For example, when the two frequency signals are referred to as a first frequency signal and a second frequency signal, the first frequency signal may be a signal continuing for 100 ms with a frequency of 2.5 KHz, and the second frequency signal may be a signal continuing for 100 ms with a frequency of 2.9 KHz.

In other words, the first frequency signal corresponds to '0' which is a logical value of the digital data, and the second frequency signal corresponds to '1' which is a logical value of the digital data. Consequently, the product information is expressed as a combination of frequency signals.

The input device 155 may further include a manipulation device 150. The manipulation device 150 is a kind of control means that receives input of overall commands relating to the operation of the laundry treatment machine 100 from the user. For example, a user can set a user running course such as a washing course, a rinsing course, a dehydrating course or drying course through the manipulation device 150, set various options under the washing conditions, or input an update command of the product operating program.

Meanwhile, a memory device 125 is a temporary storage space that temporarily stores a sensed value of the sensing device 180 and a user input value through the user input device 155.

In addition, a display device 190 may be further provided to visually display a volume or frequency characteristic of a sound output through the sound output device 140, or an update proceeding state.

In the meantime, the conversion device 170 may include an encoder and a modulator. The encoder may encode each bit of the product information into symbols. The modulator may modulate the symbols into an analog signal. The modulated signal, e.g. the at least one acoustic signal, may then be output to the sound output device 140. The sound output device 140 may receive the modulated signal, e.g. the at least one acoustic signal, and output the same as a sound.

On the contrary, the inverse conversion device 160 may include a decoder and demodulator. The sound input device 130 may receive the sound which includes the update information. The sound may then be output to the demodulator as an analog signal. The demodulator may demodulate the analog signal into the symbols. The decoder may decode the symbols into the update information.

Figure 3:
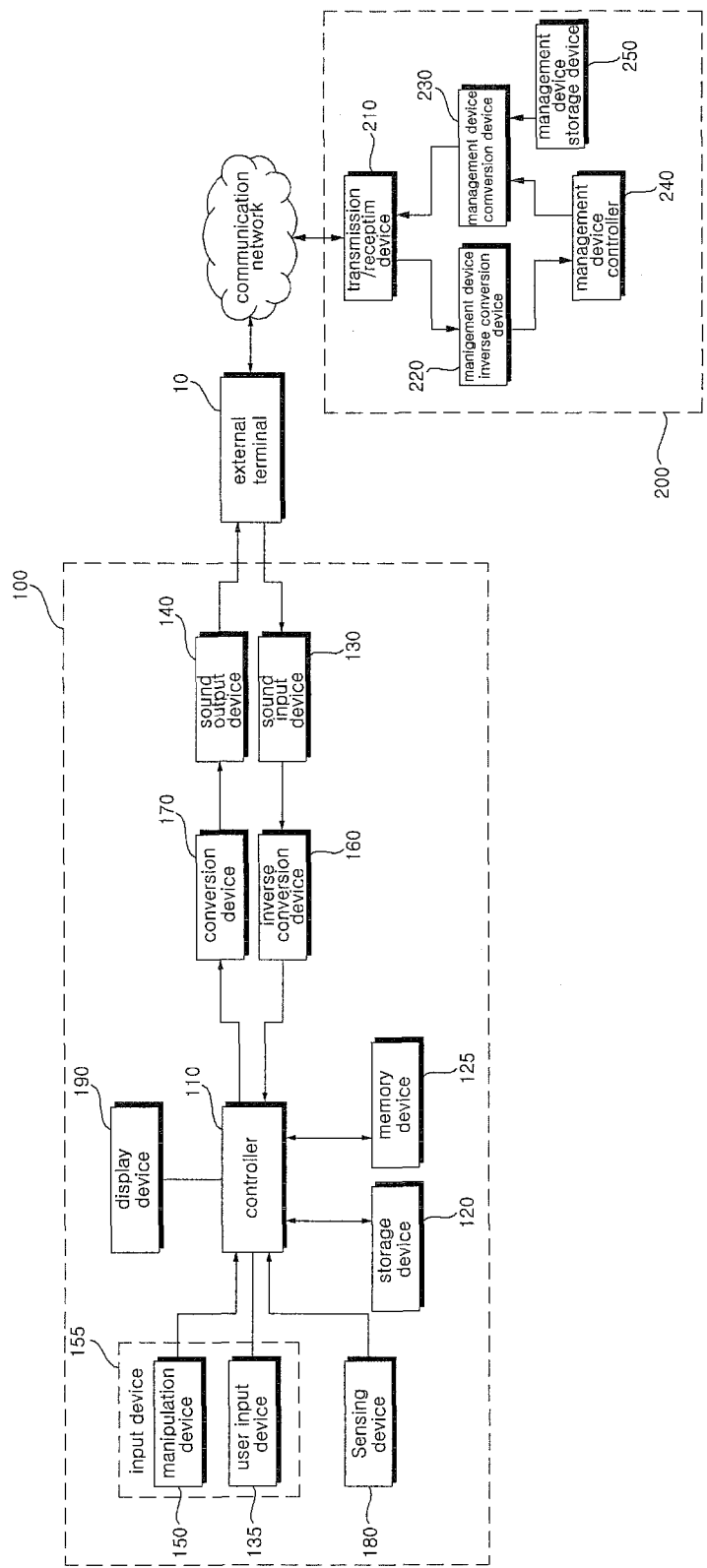
FIG. 3 is a block diagram illustrating a construction of a laundry treatment machine system 300 according to an embodiment.

FIG. 3 is a block diagram illustrating a construction of a laundry treatment machine system 300 according to another embodiment of the present invention. Referring to FIG. 3, the laundry treatment machine system 300 includes the laundry treatment machine 100 explained above, an external terminal 10 that can communicate with a communication network, and a management device 200 that can communicate with the external terminal 10, receives a sound including product information of the laundry treatment machine 100, judges whether to update a product operating program of the laundry treatment machine 100 through the analysis of the received sound, and sends update information when the update is necessary.

The management device 200 includes a management device controller 240 that controls overall operations of the management device 200, a transmission/reception device 210 that transmits the sound being input via the communication network and including the product information to a management device inverse conversion device 220 explained later, and transmits a predetermined signal input from a management device conversion device 230 to the external terminal 10 via the communication network, the management device inverse conversion device 220 that converts the sound being received at the transmission/reception device 210 and including the product information into data readable by the management device controller 240, and a management device storage device 250 that stores an operating system for controlling the management device 200 and the update information for the product operating program of the laundry treatment machine 100.

On the other hand, the communication network may be a cable or mobile communication network, and the external terminal 10 may be a wire/wireless telephone or a mobile communication terminal. Generally, since the laundry treatment machine 100 is installed outdoors, e.g. on a veranda at home, a portable communication equipment such as a mobile communication terminal is preferable to receive input of the sound output through the sound output device 140.

The transmission/reception device 210 is connected to the external terminal 10 via the communication network, and electrically connected to the management device inverse conversion device 220 and the management device conversion device 230. That is, the transmission/reception device 210 is a kind of modem that converts the sound being transmitted via the communication network and including the product information into an analog signal, and converts a predetermined signal transmitted from the management device conversion device 230 into a signal transmittable via the communication network.

The management device inverse conversion device 220 serves as an AD converter that receives the analog signal including the product information from the transmission/reception device 210, and converts the analog signal into a digital signal. Here, the signal output through the management device inverse conversion device 220 is a digital signal, which is read by the management device controller 240.

The management device controller 240 reads an information on the product operating program of the laundry treatment machine 100 included in the product information. When update information of the product operating program exists in the management device storage device 250, the management device controller 240 controls the management device 200 to transmit the update information to the laundry treatment machine 100.

The foregoing process will be explained concretely. The management device controller 240 controls the management device conversion device 230 to convert the update information into an acoustic signal which is an electrical signal with a frequency characteristic. In other words, the management device controller 240 converts the update information stored in the management device storage device 250 into a combination of frequency signals including two different unit frequency signals, and sends the acoustic signal to the external terminal 10 via the communication network.

Any one of the two frequency signals corresponds to '0' which is a logical value included in the update information, and the other corresponds to '1' which is a logical value included in the update information. That is, the update information formed of the digital data having the logical values of '0' and '1' is converted into the acoustic signal having the frequency characteristic and including the same information.

The acoustic signal is transmitted to the transmission/reception device 210. The transmission/reception device 210 sends the acoustic signal to the external terminal 10 via the communication network.

Figure 4:
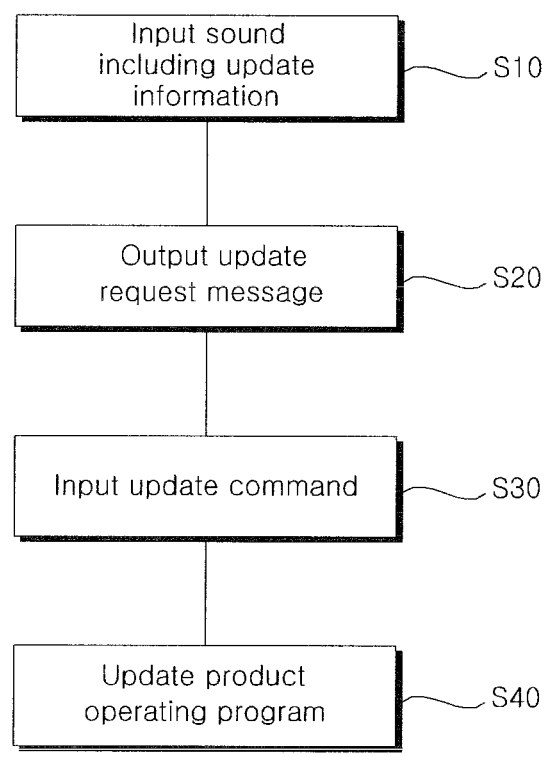
FIG. 4 is a flow chart showing an update process of the laundry treatment machine 100 according to the an embodiment. of the present invention.

FIG. 4 is a flowchart showing an update process of the laundry treatment machine 100 according to the one embodiment of the present invention. Referring to FIG. 4, when the sound being transferred via air vibration and including the update information for the product operating program of the laundry treatment machine 100 is input through the sound input device 130 (S10), the sound output device 140 outputs to the user a message for requesting update of the product operating program, such as 'New program is found. Would you like to update?' (S20).

When the update request message has been output, the user inputs an update command through the manipulation device 150 (S30).

When the update command has been input through the manipulation device 150, the controller 110 updates the product operating program of the laundry treatment machine 100 stored in the storage device 120 (S40).

That is, in this embodiment, the laundry treatment machine 100 receives input of the sound including the update information from the outside, and checks an intention of the user, so that whether to update the product operating program of the laundry treatment machine 100 can be determined by the user's selection.

Figure 5:
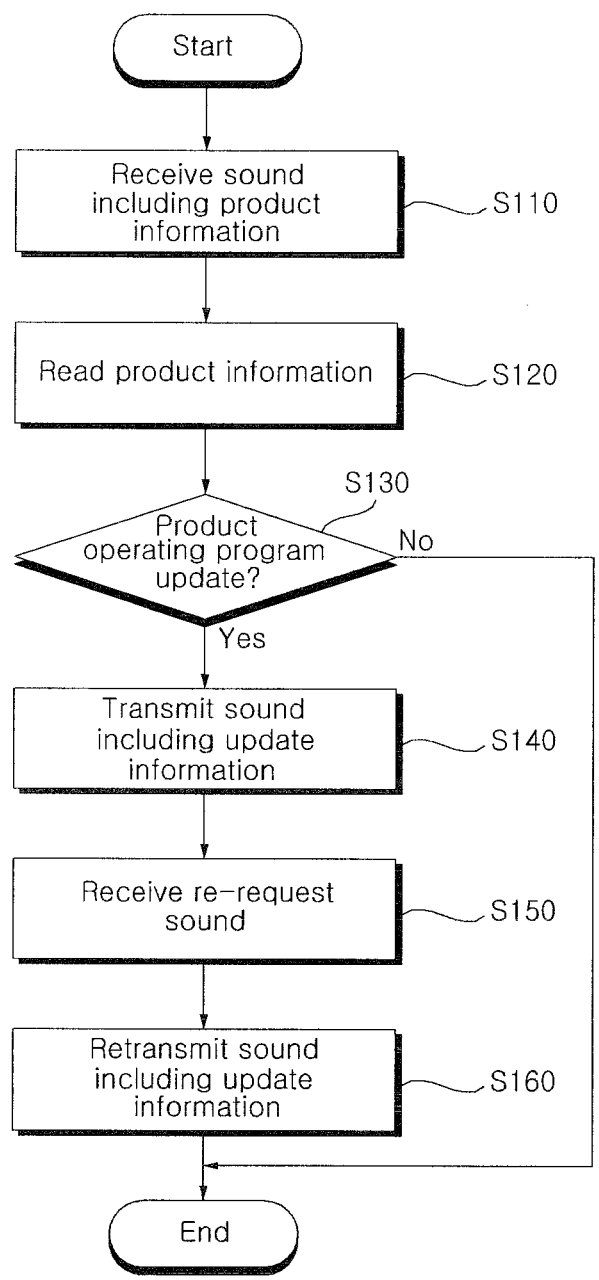
FIG. 5 is a flow chart showing a process for a management device 200 of FIG. 3 judging whether to update a product operating program of the home appliance 100.

FIG. 5 is a flowchart showing a process for the management device 200 of FIG. 3 judging whether to update the product operating program of the home appliance 100. Referring to FIG. 5, the transmission/reception device 210 receives the sound including the product information of the laundry treatment machine 100 from the user (S110).

The management device inverse conversion device 220 converts the sound including the product information into digital data readable by the management device controller 240. Here, the management device controller 240 reads information on the product operating program of the laundry treatment machine 100 which is included in the product information (S120), searches for update information for the product operating program in the management device storage device 250, and judges whether it is necessary to update the product operating program (S130).

As the judgment result, when it is necessary to update the product operating program of the laundry treatment machine 100, the management device controller 240 controls the management device conversion device 230 to convert the update information stored in the management device storage device 250 into an acoustic signal which is an electrical signal with a frequency characteristic.

Thereafter, the management device controller 240 controls the transmission/reception device 210 to transmit the acoustic signal to the user (S140). That is, the transmission/reception device 210 transmits the acoustic signal to the external terminal 10 such as a mobile communication terminal of the user via the communication network.

The acoustic signal including the update information is output via the external terminal 10 in the form of a sound including same update information. The user inputs the sound to the laundry treatment machine 100 to attempt to update the product operating program of the laundry treatment machine 100. Here, if the acoustic signal including the update information is modulated or distorted during the communication process, or if the sound is interfered with ambient noise while being input to the laundry treatment machine 100, the update of the product operating program of the laundry treatment machine 100 becomes unsuccessful. In this case, the user inputs a retransmission request command through the manipulation device 150 of the laundry treatment machine 100.

The retransmission request command is sent to the management device 200 via the communication network. When the retransmission request command has been received at the transmission/reception device 210 (S150), the management device controller 240 controls the transmission/reception device 210 to retransmit the update information for the product operating program of the laundry treatment machine 100 (S160).

In other words, when the user cannot update the product operating program of the laundry treatment machine 100 due to signal modulation and distortion occurring during the signal transmission using the communication network, or signal interference caused by a surrounding environment of the laundry treatment machine 100, the acoustic signal including the update information is retransmitted to accurately update the product operating program of the laundry treatment machine 100.

Figure 6:
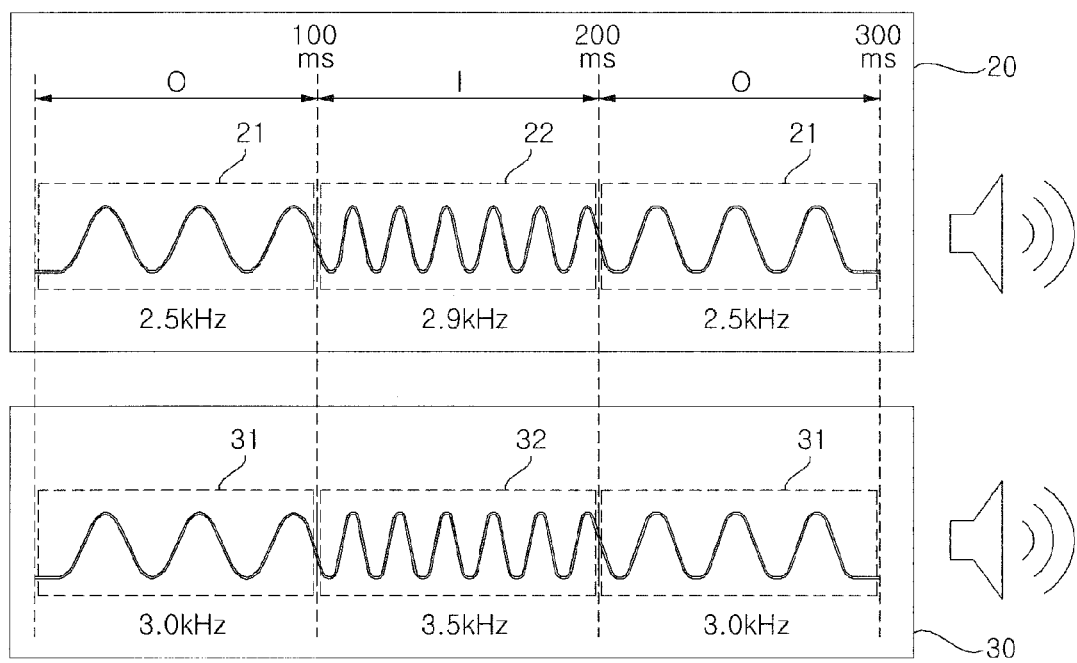
FIG. 6 shows an example of an acoustic signal including update information for the product operating program of the laundry treatment machine 100, which has been converted in a management device conversion device 230.

FIG. 6 illustrates one example of the acoustic signal including the update information for the product operating program of the laundry treatment machine 100, which has been converted in the management device conversion device 230. Referring to FIG. 6, the management device conversion device 230 converts the update information for the product operating program of the laundry treatment machine 100 into a first acoustic signal 20 and a second acoustic signal 30. The second acoustic signal 30 is a signal with a different frequency band from that of the first acoustic signal 20.

The first acoustic signal 20 includes a plurality of unit signals. Each of the plurality of unit signals is a first frequency signal, or a second frequency signal with a different frequency from that of the first frequency signal.

The second acoustic signal 30 includes a plurality of unit signals. Each of the plurality of unit signals is a third frequency signal, or a fourth frequency signal with a different frequency from that of the third frequency signal.

Still referring to FIG. 6, the first acoustic signal 20 is composed of signals with a frequency bandwidth of 2 KHz. The first frequency signal 21 is a signal output for 100 ms with a frequency of 2.5 KHz, and the second frequency signal 22 is a signal output for 100 ms with a frequency of 2.9 KHz.

In the meantime, the second acoustic signal 30 is composed of signals with a frequency bandwidth of 3 KHz. The third frequency signal 31 is a signal output for 100 ms with a frequency of 3.0 KHz, and the fourth frequency signal 32 is a signal output for 100 ms with a frequency of 3.5 KHz.

The first to fourth frequency signals are not limited to the embodiment of FIG. 6, but may be formed of various frequency signals.

As set forth herein, since the management device conversion device 230 converts the update information into the first acoustic signal 20 and the second acoustic signal 30 which have different frequency bands, consequently, the transmission/reception device 210 transmits the first acoustic signal 20 and the second acoustic signal 30 to the external terminal 10 via the communication network.

Accordingly, even if the signal interference occurs due to the surrounding environment of the laundry treatment machine 100, since the management device 200 consecutively sends the update information as the first acoustic signal 20 and the second acoustic signal 30 which have different frequency characteristics, it can more accurately transfer the update information.

So as to solve the signal interference and distortion, the management device 200 may output the same acoustic signal twice, or consecutively output two or more acoustic signals having different frequency bands.

Meanwhile, in this embodiment, the management device 200 converts the update information for the product operating program of the laundry treatment machine 100 into the first acoustic signal 20 and the second acoustic signal 30 in advance, and consecutively outputs the same. However, the management device 200 may be configured to convert the update information into the first acoustic signal 20 and send the same, and then to convert the update information into the second acoustic signal 30 and send the same.

In addition, referring to FIG. 5, the management device 200 according to the present invention can be configured to retransmit the acoustic signal including the update information upon the retransmission request of the user. Therefore, the management device 200 may be configured to send the first acoustic signal 20 upon the retransmission request of the user, after sending the first acoustic signal 20, and may also be configured to send the second acoustic signal 30 upon the retransmission request of the user, after sending the first acoustic signal 20.

Moreover, the management device 200 according to one embodiment of the present invention may be configured to convert the update information into the second acoustic signal 30 and send the second acoustic signal 30 to the user upon the retransmission request of the user, after sending the first acoustic signal 20.

In the meantime, the management device 200 may further include a display device (not shown) that outputs the product information as an image so that a repairman can see operation information or fault information included in the product information.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangement of the subject combination arrangement within the scope of the disclosure, the drawings and the appended claims. In addition to variations and modifications in the component parts and/or arrangements, alternative uses will also be apparent to those skilled in the art.

What is claimed is:

1. A home appliance system, comprising:
   a home appliance configured to, upon receipt of a signal conversion command, output a first sound corresponding to product information, including identification of a present product operating program;
   an external terminal configured to transfer the first sound output from the home appliance via a communication network to a management device and receive an analog acoustic signal from the management device via the communication network and output a second sound corresponding to the analog acoustic signal received from the management device; and
   the management device, which inversely converts the first sound being transmitted via the communication network into the product information and searches for a digital update information for the product operating program of the home appliance, and transfers an analog acoustic signal corresponding to the digital update information to the external terminal via the communication network,
   wherein the home appliance comprises:
   a sound input device that receives the second sound output from the external terminal in response to receipt of the analog acoustic signal corresponding to the digital update information;
   an inverse conversion device that inversely converts the second sound input through the sound input device to generate the digital update information;
   a storage device in which the product operating program of the home appliance is stored; and a controller that updates the product operating program using the digital update information generated by the inverse conversion device, wherein the management device further comprises:

a storage device that stores the digital update information for the product operating program of the home appliance;

a transmission/reception device that communicates with the external terminal via the communication network;

a conversion device that converts the digital update information stored in the storage device into the analog acoustic signal; and a controller that controls the transmission/reception device to transmit the analog acoustic signal output from the conversion device via the communication network, and after the transmission/reception device transmits the analog acoustic signal, controls the conversion device of the management device to convert the digital update information into another acoustic signal with a different frequency band from that of the previous acoustic signal, and controls the transmission/reception device to transmit the another acoustic signal.

2. The home appliance system of claim 1, wherein the home appliance further comprises:

an input device configured to receive input of an external signal for executing fault diagnosis from a user, wherein the controller of the home appliance, upon receipt of the external signal through the input device, outputs a first control signal;

a conversion device that, upon receipt of the first control signal, converts the digital product information into an analog acoustic signal; and a sound output device that outputs a sound corresponding to the analog acoustic signal output by the conversion device of the home appliance.

3. The home appliance system of claim 1, wherein the product information includes information on the product operating program of the home appliance.

4. The home appliance system of claim 1, wherein, when the transmission/reception device receives a retransmission request signal after transmitting the analog acoustic signal, the controller of the management device controls the transmission/reception device to retransmit the analog acoustic signal.

5. The home appliance system of claim 1, wherein, when the transmission/reception device receives a retransmission request signal after transmitting the analog acoustic signal, the controller of the management device controls the conversion device of the management device to convert, the digital update information into the another analog acoustic signal.

* * * * *